United States Patent [19]
Woodside et al.

[11] Patent Number: 5,744,089
[45] Date of Patent: Apr. 28, 1998

[54] METHOD AND APPARATUS FOR THE IN-LINE IMPREGNATION OF FIBERS WITH A NON-AQUEOUS CHEMICAL TREATMENT

[75] Inventors: Andrew Woodside; Margaret Woodside, both of Pickerington; David Shipp, Newark; Frank J. Macdonald, Granville, all of Ohio

[73] Assignee: Owens-Corning Fiberglas Technology Inc., Summit, Ill.

[21] Appl. No.: 872,232

[22] Filed: Jun. 10, 1997

Related U.S. Application Data

[63] Continuation of Ser. No. 487,948, Jun. 7, 1995, abandoned.
[51] Int. Cl.$^6$ .................................................. B29C 47/88
[52] U.S. Cl. .......................... 264/211.14; 57/304; 57/3.3; 57/362; 242/129.1; 242/444; 427/172; 427/196; 427/177; 427/211; 264/211.12; 264/174; 264/211.17; 264/211.13
[58] Field of Search .................................. 427/172, 177, 427/196, 211, 372.2, 374.1; 57/309, 313, 362; 242/129.1, 444; 229/91, 92; 226/91, 92; 264/211.12, 171, 174, 211.13, 211.17, 211.14, 211.18

[56] References Cited

U.S. PATENT DOCUMENTS

| | | |
|---|---|---|
| 2,897,874 | 8/1959 | Stalego et al. . |
| 2,928,121 | 3/1960 | Plumbo . |
| 3,273,812 | 9/1966 | La Cassee . |
| 3,771,324 | 11/1973 | Klink et al. . |
| 4,194,896 | 3/1980 | Symborski et al. . |
| 4,344,786 | 8/1982 | Symborski et al. . |
| 5,011,523 | 4/1991 | Roncato et al. ............................ 65/2 |
| 5,085,938 | 2/1992 | Watkins . |
| 5,258,227 | 11/1993 | Gaa et al. ............................ 428/392 |
| 5,454,846 | 10/1995 | Roncato et al. ............................ 65/381 |

*Primary Examiner*—Merrick Dixon
*Attorney, Agent, or Firm*—C. Michael Gegenheimer; Inger H. Eckert

[57] ABSTRACT

A method and apparatus is disclosed for the in-line pre-impregnation of glass or synthetic fibers with a non-aqueous chemical treatment. The apparatus includes a first applicator for applying a curable, non-aqueous chemical treatment agent and a second applicator for applying a curing agent for the chemical treatment agent. The fibers are passed over the first and second applicators which are arranged either in parallel or in series, and are then joined by a gathering device to initiate curing of the chemical treatment agent on the fibers. In an alternative embodiment, the apparatus comprises a spray gun in which a mixture of the non-aqueous chemical treatment agent and curing agent are sprayed onto an applicator roll in contact with the fibers.

10 Claims, 7 Drawing Sheets

METHOD AND APPARATUS FOR THE IN-LINE IMPREGNATION OF FIBERS WITH A NON-AQUEOUS CHEMICAL TREATMENT

CROSS-REFERENCE TO RELATED APPLICATION(S)

This is a continuation of U.S. patent application Ser. No. 08/487,948, filed Jun. 7, 1995, now abandoned.

BACKGROUND OF THE INVENTION

The present invention relates to an improved method and apparatus for pre-impregnating glass or synthetic fibers with a curable, non-aqueous chemical treatment, and more particularly, to such a method which may be performed in-line with the glass forming process.

Glass fibers are commonly manufactured by supplying molten glass to a bushing, drawing glass fibers from the bushing, and applying an aqueous size to the fibers with an applicator roll. The fibers are then packaged and dried for further processing.

In order to fabricate composite parts, the fibers are often further chemically treated in an off-line process with a curable resin. The resins may be thermosetting or thermoplastic and may be either aqueous based or totally organic. For example, continuous glass fibers may be treated with an aqueous based thermoplastic, dried in an oven and used to reinforce asphalt roads. Alternatively, continuous glass fibers may be treated with a thermosetting resin and then pulled through a heated die to make parts such as ladder rails. This treatment of glass fibers is commonly referred to as "off-line" processing. In all cases, however, the continuous glass fibers must be spread apart, impregnated with resin and then recombined. This requirement almost always results in the use of additional hardware such as spreader bars, impregnation baths, and drying or curing ovens. These types of processes have the disadvantage that they add cost and complexity. In addition, in many cases, the resultant extra handling of the glass fibers can cause breakage of the individual glass filaments which can lead to reduced composite properties. Thus, while the off-line treatment methods may be effective, they are time consuming and inefficient and always require additional process steps beyond the glass forming step.

Gaa et al, U.S. Pat. No. 5,258,227, describes an aqueous chemical treatment which may be applied to glass fibers during the forming process and then dried. However, this method still requires that the fibers be wound into packages which are then dried at length in an oven.

Accordingly, there is still a need in the art for a method and apparatus for pre-impregnating glass fibers with a curable chemical treatment during the forming process which does not require additional drying steps, and which results in treated fibers having good handling and processing characteristics.

SUMMARY OF THE INVENTION

The present invention meets those needs by providing an improved method and apparatus for pre-impregnating glass or synthetic fibers by applying a curable, non-aqueous chemical treatment to glass or synthetic fibers. The method is performed in-line with the glass forming process and results in treated fibers having improved properties for further handling and processing.

In accordance with one aspect of the present invention, an apparatus is provided for the in-line pre-impregnation of glass or synthetic fibers with a non-aqueous chemical treatment comprising first and second sources of fibers, a rotatable member adapted to wind or chop the fibers, or to form a mat from the fibers, and first and second applicators which are positioned between the first and second sources of the fibers and the rotatable member. The first applicator is adapted to apply a curable, non-aqueous chemical treatment agent to the fibers from the first source, and the second applicator is adapted to apply a curing agent for the chemical treatment agent to fibers from the second source. The apparatus also includes a device for gathering together the fibers from both sources after the chemical treatment agent and curing agent have been applied to thereby initiate curing of the chemical treatment agent.

In a preferred embodiment of the invention, the gathering device is preferably heated or cooled in order to accelerate or decelerate the reaction of the chemical treatment agent and curing agent on the glass.

In one embodiment of the invention, a heated bushing is used as the first and second sources of fibers. Thus, the heated bushing supplies separate streams of molten glass which are drawn into fibers.

In this embodiment, the first and second applicators are preferably arranged in parallel position with a collar therebetween. In an alternative embodiment of the invention, a heated bushing is used as the first and second sources of fibers, and the first and second applicators are arranged in series.

In yet another alternative embodiment, the first source of fibers is a heated bushing and the second source of fibers is an unwinding station for previously formed glass or synthetic fibers.

In one embodiment of the invention, the first and second applicators comprise kiss rolls, where the first applicator comprises a kiss roll having a reservoir containing the curable, non-aqueous chemical treatment agent and the second applicator comprises a kiss roll having a reservoir containing the curing agent. In an alternative embodiment, the first and second applicators comprise porous rolls, where the first applicator comprises a porous roll supplied with the curable, non-aqueous chemical treatment agent by a pump and the second applicator comprises a porous roll supplied with the curing agent by a pump.

In yet another embodiment of the invention, the apparatus comprises a source of fibers, a rotatable member adapted to wind the fibers, a first source for supplying a curable, non-aqueous chemical treatment agent, and a second source for supplying a curing agent for the chemical treatment agent. In this embodiment, the source of fibers may comprise a heated bushing, or alternatively, the source of fibers may be an unwinding station for previously formed glass or synthetic fibers.

The apparatus further includes a spray gun adapted to receive the chemical treatment agent and the curing agent to form a mixture which may be applied to the fibers. Preferably, the apparatus includes an applicator roll against which the spray from the gun is directed. Coating is accomplished by the action of the roll rotating and contacting the glass or synthetic fibers.

The apparatus preferably further includes a third source for supplying a solvent which is used to purge the spray gun of the mixture at regular intervals to prevent premature curing of the chemical treatment agent and curing agent.

The apparatus also includes a gathering device to gather the fibers after the mixture has been sprayed on the fibers. The gathering device may be heated or cooled as desired.

The present invention also provides a process for the in-line pre-impregnation of glass or synthetic fibers with a non-aqueous chemical treatment comprising the steps of supplying first and second sources of fibers, applying a curable, non-aqueous chemical treatment agent from a first applicator to the first source of fibers, applying a curing agent for the chemical treatment agent from a second applicator to the second source of fibers, and gathering the fibers together in a gathering device from both sources, thereby initiating curing of the chemical treatment agent. The process may further include the step of heating or cooling the fibers with the gathering device.

Preferably, the curable, non-aqueous chemical treatment agent comprises an epoxy resin. The curing agent for the non-aqueous chemical treatment is preferably selected from the group consisting of amines and acid anhydrides. In some cases, the cure may be accelerated by the addition of Lewis acids.

In one embodiment, the first and second sources of fibers is a heated bushing which splits the glass into two streams as it exits the bushing. The first and second applicators are arranged in parallel position with a collar therebetween such that the first source of fibers from one stream is passed over the first applicator which applies the curable, non-aqueous chemical treatment agent and the second source of fibers from the other stream is applied with the curing agent by the second applicator. In an alternative embodiment, the first source of fibers is a heated bushing and the second source of fibers is an unwinding station for previously formed glass or synthetic fibers where the first source of fibers from the bushing is passed over the first applicator and the second source of previously formed fibers is passed over the second applicator.

In an alternative embodiment of the invention where the first and second applicators are arranged in series, the first and second sources of fibers are drawn into a single stream from the bushing. The fibers are passed over the first applicator which applies the curable, non-aqueous chemical treatment agent and then over the second applicator which applies the curing agent.

In another alternative embodiment, the first source of fibers is the heated bushing and the second source of fibers is an unwinding station for previously formed glass or synthetic fibers. In this embodiment, the fibers from the heated bushing are applied with the non-aqueous chemical treatment agent while the fibers from the unwinding station are applied with the curing agent. The fibers are then joined together by the gathering device to initiate curing.

In another embodiment of the invention, the process comprises the steps of drawing fibers from a heated bushing and supplying a curable, non-aqueous chemical treatment agent and a curing agent to a spray gun to form a mixture. The mixture is then sprayed on the applicator which subsequently coats the fibers and curing is initiated. The fibers are then gathered together in a gathering device which may be heated or cooled.

The resulting pre-impregnated fibers may be further processed and impregnated in a variety of applications including reaction injection molding and injection molding. The fibers may also be used in pultrusion and filament winding processes, or the fibers may be further processed in knitted or woven form.

Accordingly, it is a feature of the present invention to provide a method and apparatus for the in-line pre-impregnation of glass or synthetic fibers with a non-aqueous chemical treatment. This, and other features and advantages of the present invention will become apparent from the following detailed description, the accompanying drawings, and the appended claims.

DETAILED DESCRIPTION OF THE PREFERRED EMBODIMENT

The method and apparatus of the present invention allows the application and curing of a non-aqueous chemical treatment to glass fibers during an in-line process. This provides several advantages over prior art methods which apply aqueous treatments during the glass forming process which require subsequent drying steps. The present invention utilizes a fast-reacting non-aqueous chemical treatment which allows the resulting fibers to be processed immediately after treatment, either in-line or off-line. For example, the pre-impregnated fibers may be wound directly onto a package or sent to an in-line chopper or in-line mold for further processing. The pre-impregnated fibers may be used effectively in a variety of impregnation applications including reaction injection molding, which may be performed in-line or off-line. The fibers may also be pultruded or wound into filaments. The non-aqueous chemical treatment agent comprises an epoxy resin. A preferred epoxy resin is Shell EPON 8121, available from Shell Oil Company. The curing agent may comprise a number of amines or acid anhydrides such as polyamides which are available from Ciba-Geigy or Shell Oil Company. The resin and curing agent are preferably applied in a stoichiometric ratio; however, the ratio may vary depending on the desired end use of the fibers. For example, the amount of curing agent may be greater in applications where it is desired that the fibers be fully cured, while the epoxy resin should be present in greater amounts in applications where it is the desired that the fibers be only partially cured.

In order to make the glass easier to handle for subsequent processing, a small amount of a thermosetting additive or epoxy resin in powdered form may be added to either the epoxy resin or curing agent.

Figure 1:
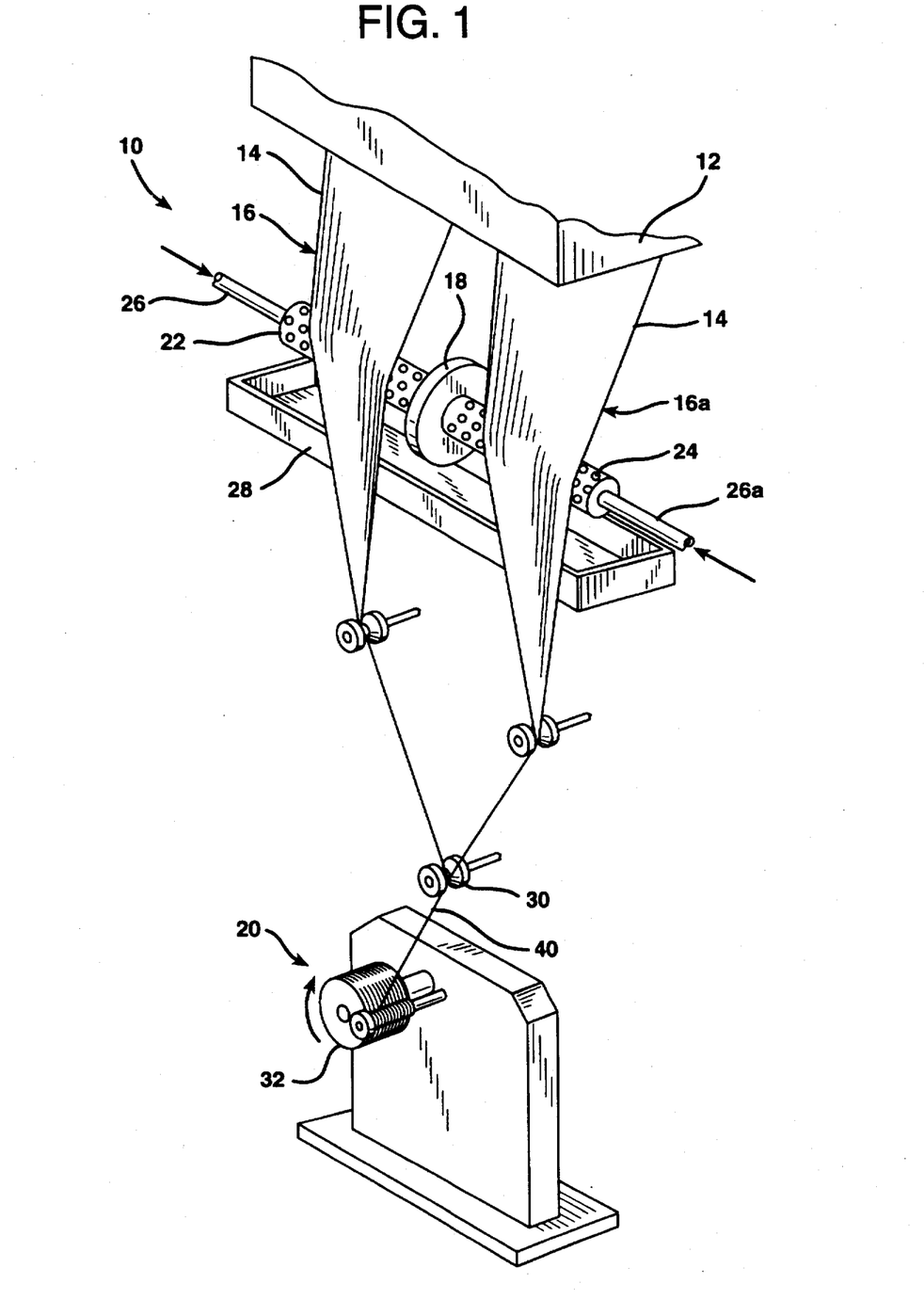
FIG. 1 is a perspective view of one embodiment of the apparatus of the present invention.

FIG. 1 illustrates one embodiment of the apparatus 10 of the present invention which includes a heated bushing 12 having a number of orifices (not shown) through which a plurality of streams of molten glass are discharged. The streams of glass are mechanically drawn to form continuous fibers 14 via a drawing device illustrated as a rotatable member or winder device 20. As shown, the bushing splits the glass into two streams 16 and 16a. The glass is preferably split in a ratio that represents the desired mix of epoxy resin to curing agent.

As shown in FIG. 1, the apparatus utilizes a first applicator 22 for supplying the epoxy resin and a second applicator 24 for supplying the curing agent. In the embodiment shown, the applicators comprise porous rolls which are supplied with the resin and curing agent by pumps (not shown) through respective lines 26 and 26a. It should be appreciated that the applicator rolls may be of different diameters and varying porosity depending on the desired application.

The applicator rolls are preferably separated by a collar 18 which functions to prevent premature mixing of the resin and curing agent. If desired, a drip pan 28 may be positioned beneath the rolls to collect any runoff as the resin and curing agent are applied to the fibers from the rolls.

The first stream 16 is preferably passed over the first applicator roll 22 where the non-aqueous chemical treatment agent is applied and the second stream 16a is passed over the second applicator roll 24 where the curing agent is applied. After application of the resin and curing agent, the two streams are then rejoined into a single tow 40 by a gathering device such as gathering shoe 30 which initiates curing of the chemical treatment agent on the fibers. The gathering shoe may be heated or cooled as desired to ensure that the glass is tack free prior to further processing. From the gathering shoe 30, the fibers may be wound via the winder device 20 onto a collet 32 as shown or they may be pulled onto an in-line chopping device, depending on the desired end use for the fibers.

Figure 1A:
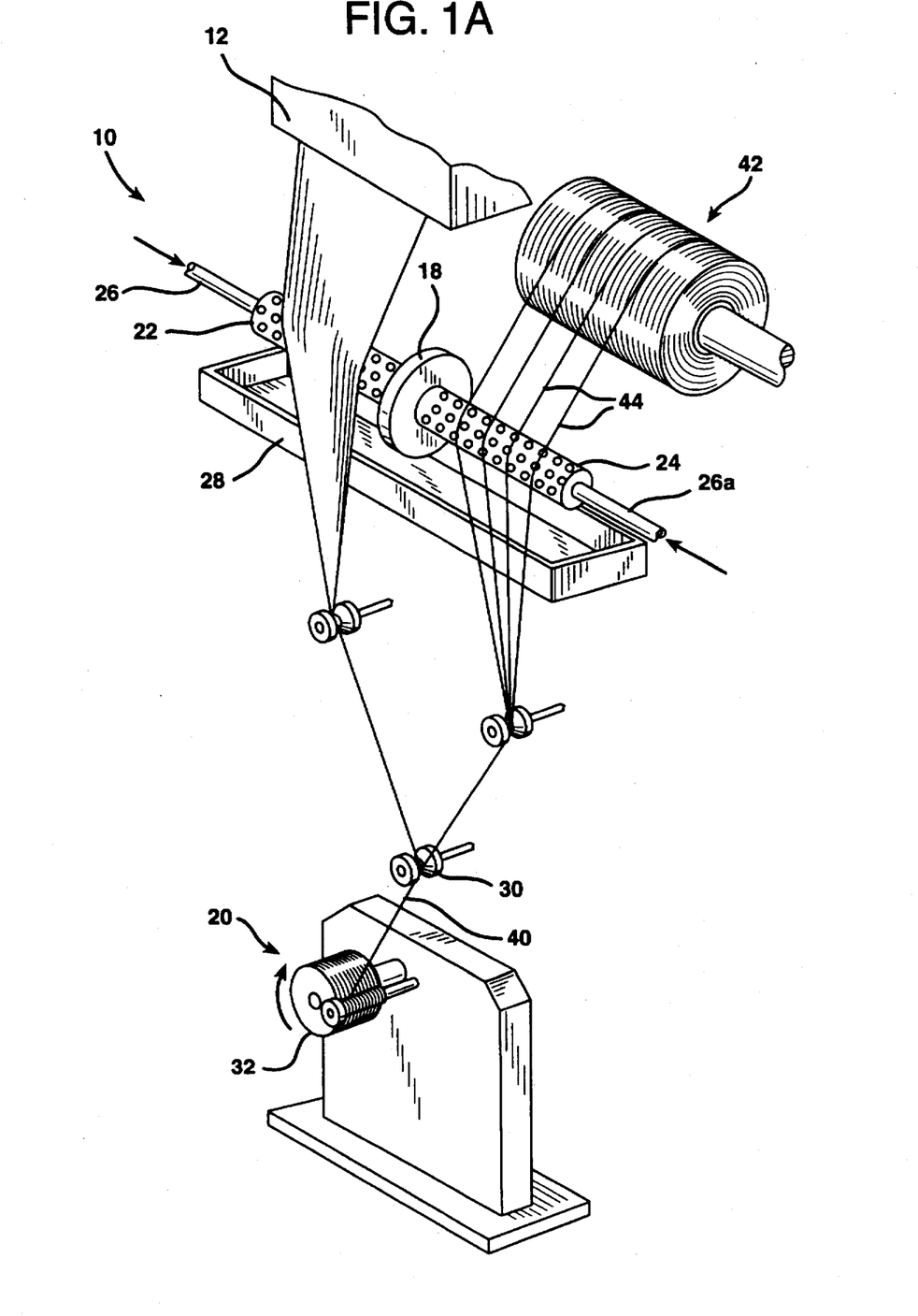
FIG. 1A is a perspective view of an alternative emodiment of the apparatus of FIG. 1.

An alternative embodiment of the apparatus is shown in FIG. 1A, in which the first source of fibers is the bushing 12 and the second source of fibers is a separate unwind station 42 from which previously formed glass or synthetic fibers 44 are unwound.

Figure 2:
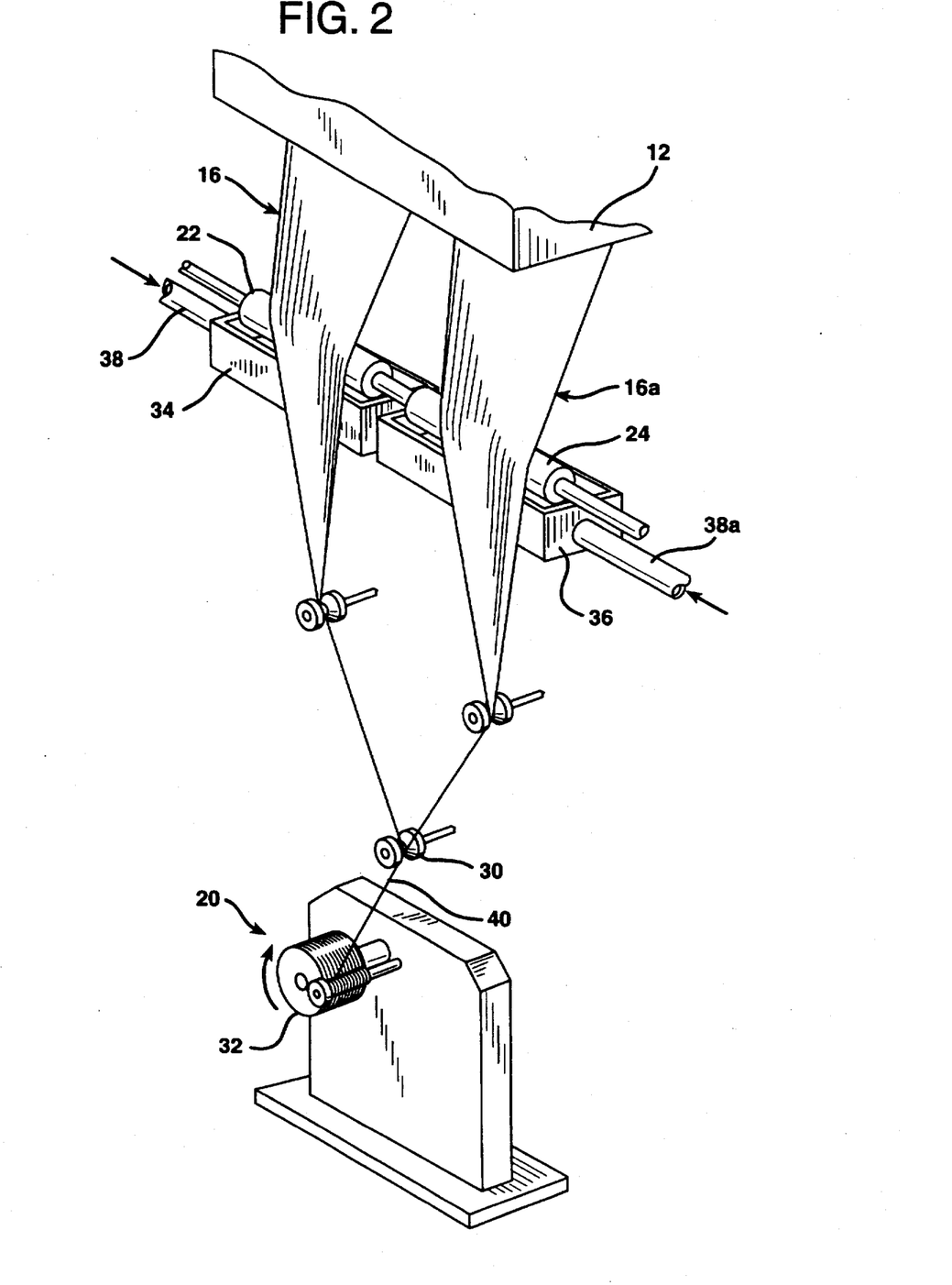
FIG. 2 is a perspective view of another alternative embodiment of the apparatus illustrated in FIG. 1.

Referring now to FIG. 2, where like reference numerals represent like elements, an alternative embodiment of the apparatus of FIG. 1 is illustrated in which the first and second applicators 22, 24 comprise kiss rolls. The first applicator 22 includes a reservoir 34 containing the resin which is supplied by a pump (not shown) through line 38, while the second applicator includes a reservoir 36 containing the curing agent which is supplied by pump (not shown) through line 38a. It should be appreciated that the apparatus of the present invention may utilize either kiss rolls or porous rolls, depending on the desired application. For example, it may be desirable to use porous rolls when working with more viscous treatments.

Figure 2A:
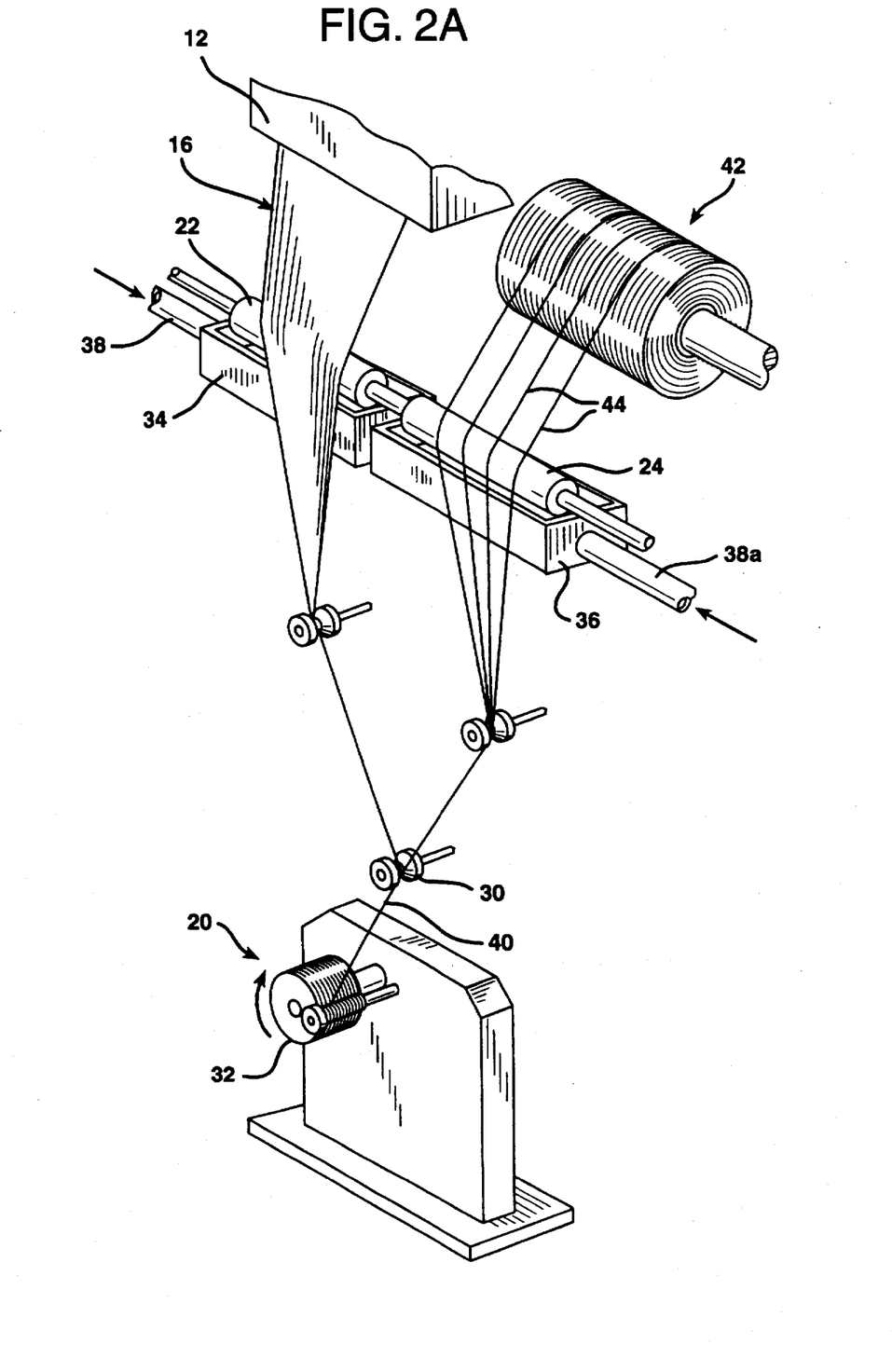
FIG. 2A is a perspective view of an alternative embodiment of the apparatus of FIG. 2.

The apparatus of FIG. 2 may also be configured so as to include a separate unwind station 42 for supplying previously formed glass or synthetic fibers 44 as shown in FIG. 2A.

Figure 3:
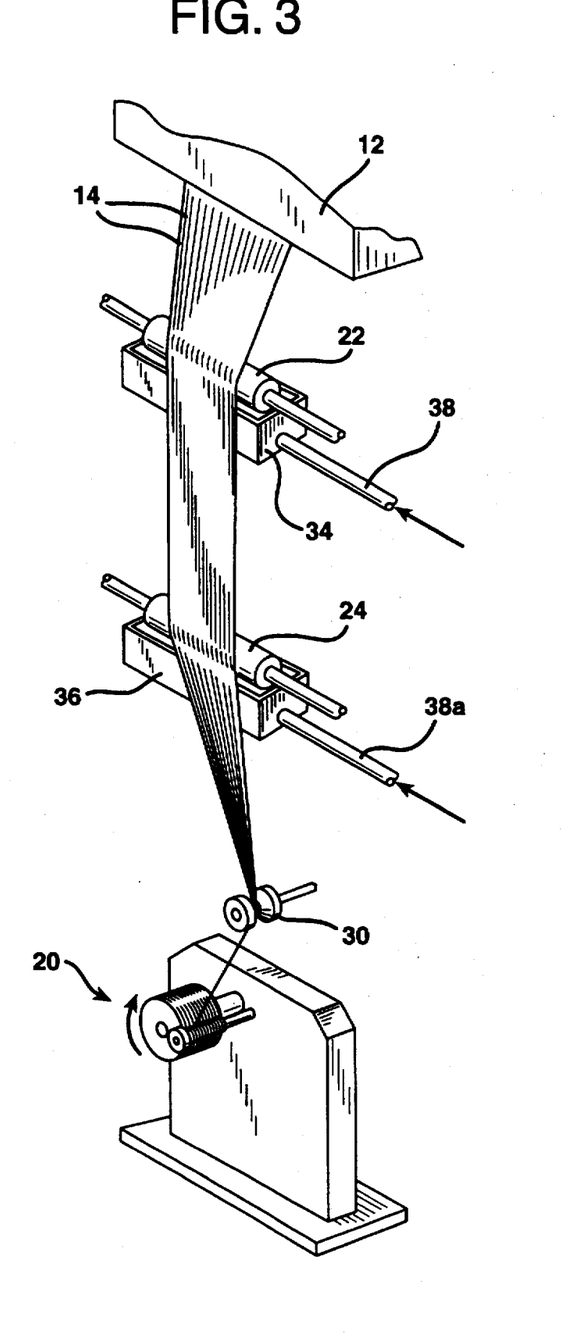
FIG. 3 is a perspective view of another embodiment of the invention.

FIG. 3 illustrates another embodiment of the invention in which the first and second applicators 22, 24 are arranged in series. As the glass fibers 14 are drawn from the bushing, they are maintained in a single stream which passes over the first applicator 22 where the resin is applied, and then over the second applicator 24 where the curing agent is applied. As shown, the applicators comprise kiss rolls having respective reservoirs 34, 36 which are supplied by pumps (not shown) through lines 38, 38a. After the fibers have traveled across both applicators, the fibers are gathered at gathering shoe 30 and then processed as desired.

Figure 4:
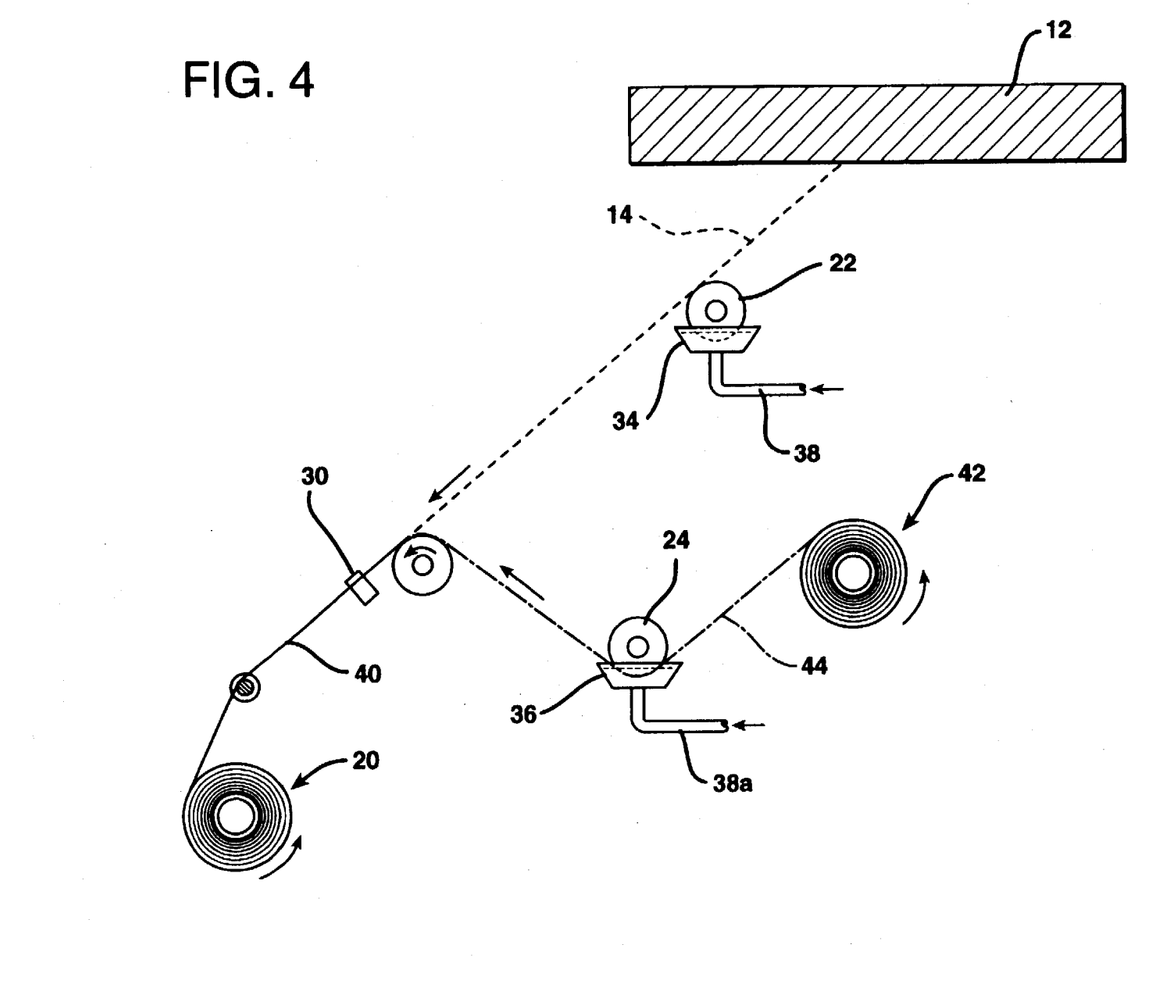
FIG. 4 is a schematic side view of yet another embodiment of the invention.

FIG. 4 illustrates yet another embodiment of the invention in which the apparatus allows previously formed synthetic fibers or fibers of different glass types to be incorporated with fibers formed during the in-line process. The apparatus includes a separate unwind station 42 from which the previously formed glass or synthetic fibers 44 are unwound. In this embodiment, glass fibers 14 drawn from bushing 12 pass over first applicator 22 which applies the epoxy resin. Fibers 44 drawn from the separate unwind station 42 pass over applicator 24 which applies the curing agent. As shown, the fibers 14 and 44 are joined at gathering shoe 30 to form a single tow 40 where the resin and curing agent come into contact with one another on the two sets of fibers and curing of the resin is initiated.

Figure 5:
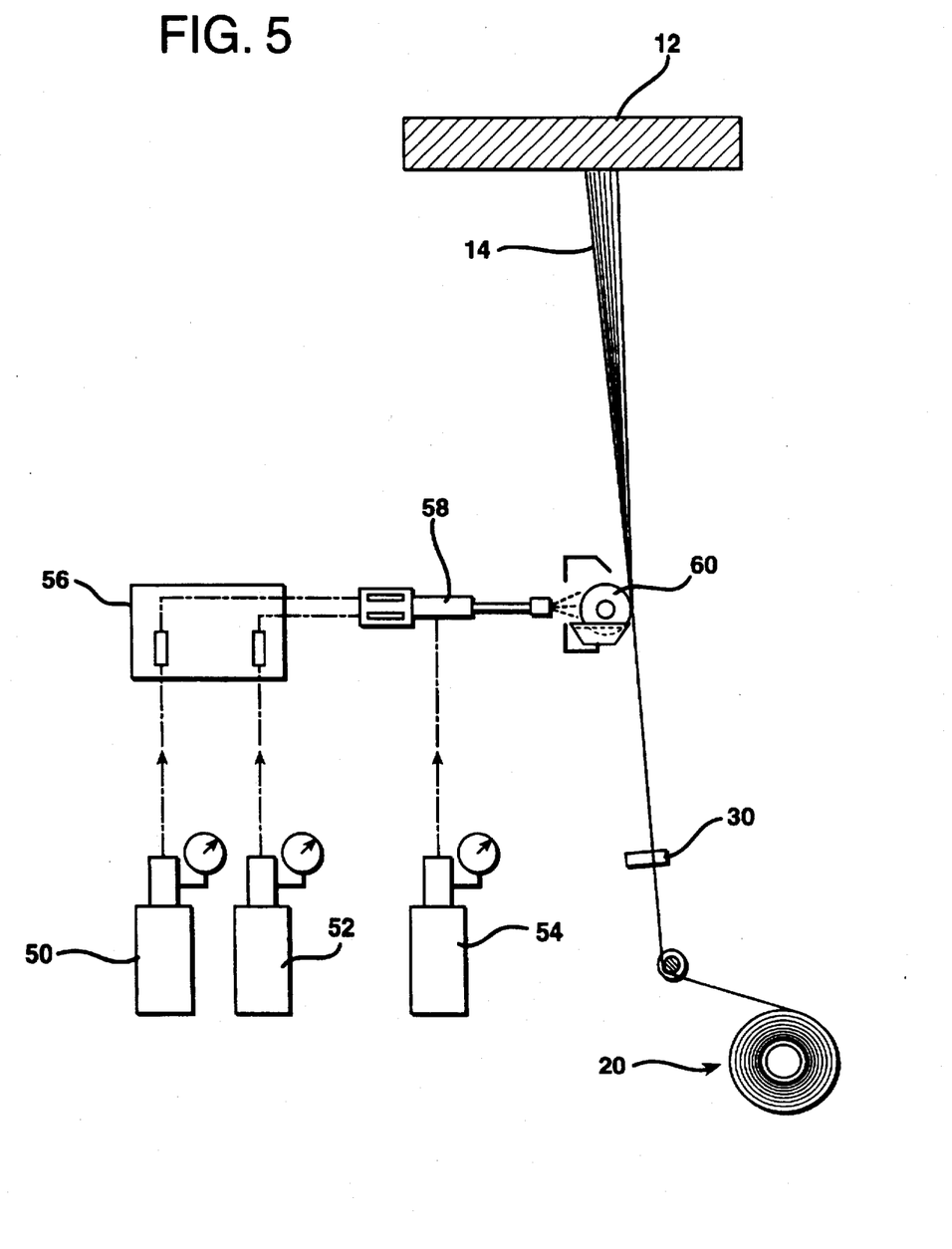
FIG. 5 is a schematic side view of yet another embodiment of the invention.

FIG. 5 illustrates a preferred embodiment of the invention in which the resin and curing agent are sprayed simultaneously onto the applicator roll 60 by a spray gun 58. In this embodiment, the apparatus includes a first tank 50 which contains the epoxy resin and a second tank 52 which contains the curing agent. A third tank 54 is also included which contains a solvent for purging the apparatus at regular intervals to prevent curing of the resin and curing agent within the spray gun.

The apparatus further includes an air motor driven formulator 56 which is adapted to meter the correct ratios of resin and curative delivered to the spray gun.

In this embodiment, the resin and curing agent are pumped from tanks 50, 52 to the air driven formulator 56 which then delivers the correct ratios of resin and curing agent to the spray gun 58. The spray gun 58 is sprayed onto the back of a rotating applicator roll 60 which comes into contact with the moving fibers so that the fibers are coated with the mixture and curing is initiated. The fibers are then passed through gathering shoe 30 where they are heated or cooled as desired for further processing.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

We claim:

1. A process for the in-line pre-impregnation of glass or synthetic fibers with a non-aqueous chemical treatment, comprising the steps of:
    (a) drawing fibers from a heated bushing;
    (b) supplying a curable, non-aqueous chemical treatment agent to a formulator;
    (c) supplying a curing agent to the formulator;
    (d) metering at a selected ratio the non-aqueous chemical treatment agent and the curing agent as a mixture from the formulator to a spray gun;
    (e) spraying the mixture from the spray gun onto an applicator roll while contacting the applicator roll with the fibers; and
    (f) gathering the fibers using a gathering device.

2. A process as defined in claim 1, further comprising heating the fibers using the gathering device.

3. A process as defined in claim 1, further comprising cooling the fibers using the gathering device.

4. A process as defined in claim 1, wherein the curable, non-aqueous chemical treatment agent comprises an epoxy resin.

5. A process as defined in claim 4, wherein the curing agent comprises a member selected from the group consisting of amines and acid anhydrides.

6. A process as defined in claim 5, wherein the curing agent comprises a Lewis-acid accelerator.

7. A process as defined in claim 1, further comprising the step of purging the spray gun with a solvent at regular intervals.

8. A process as defined in claim 1, wherein the selected ratio is stoichiometric.

9. A process as defined in claim 1 wherein, in step (e), the mixture is sprayed on a portion of the surface of the applicator roll opposite the portion of the surface contacting the fibers.

10. A process as defined in claim 1, wherein the fibers comprise glass fibers.

* * * * *